US008489619B1

(12) United States Patent
Martino et al.

(10) Patent No.: US 8,489,619 B1
(45) Date of Patent: *Jul. 16, 2013

(54) SYSTEM AND METHOD FOR THE DYNAMIC GENERATION OF CORRELATION SCORES BETWEEN ARBITRARY OBJECTS

(75) Inventors: Paul Martino, Mountain View, CA (US); Gian-Paolo Musumeci, Berkeley, CA (US); Kristopher C. Wehner, Oakland, CA (US)

(73) Assignee: Aggregate Knowledge, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/484,182

(22) Filed: May 30, 2012

Related U.S. Application Data

(60) Continuation of application No. 12/942,213, filed on Nov. 9, 2010, now Pat. No. 8,200,677, which is a division of application No. 12/008,181, filed on Jan. 8, 2008, now Pat. No. 7,853,630, which is a continuation-in-part of application No. 11/369,562, filed on Mar. 6, 2006, now Pat. No. 7,788,358.

(60) Provisional application No. 60/932,718, filed on Jun. 1, 2007.

(51) Int. Cl.
*G06F 17/30* (2006.01)

(52) U.S. Cl.
USPC .......................................................... 707/749

(58) Field of Classification Search
USPC ........................................... 707/749; 709/206
See application file for complete search history.

(56) References Cited

U.S. PATENT DOCUMENTS

| | | | | |
|---|---|---|---|---|
| 6,088,510 | A * | 7/2000 | Sims | 706/13 |
| 6,871,186 | B1 * | 3/2005 | Tuzhilin et al. | 705/26.7 |
| 7,069,272 | B2 * | 6/2006 | Snyder | 1/1 |
| 7,370,004 | B1 * | 5/2008 | Patel et al. | 705/14.37 |
| 7,693,827 | B2 * | 4/2010 | Zamir et al. | 707/999.003 |
| 7,853,630 | B2 * | 12/2010 | Martino et al. | 707/999.003 |
| 7,904,524 | B2 * | 3/2011 | Wehner et al. | 709/206 |
| 8,032,714 | B2 * | 10/2011 | Musumeci et al. | 711/137 |
| 8,200,677 | B2 * | 6/2012 | Martino et al. | 707/749 |
| 2004/0088300 | A1 * | 5/2004 | Avery et al. | 707/100 |
| 2004/0122910 | A1 * | 6/2004 | Douglass et al. | 709/214 |

* cited by examiner

*Primary Examiner* — Jean M Corrielus
(74) *Attorney, Agent, or Firm* — Mahamedi Paradice Kreisman LLP

(57) ABSTRACT

Systems and methods are described for performing the dynamic generation of correlation scores between arbitrary objects. When a behavioral event is recorded, that is to say when an end user interacts with multiple objects, relationships between objects are created. These relationships are maintained as a list. When a request for correlated items is requested based upon a seed object, a list of correlated items is dynamically created through the generation of a pivot set and a scoring algorithm to compute the list of correlated items.

14 Claims, 8 Drawing Sheets

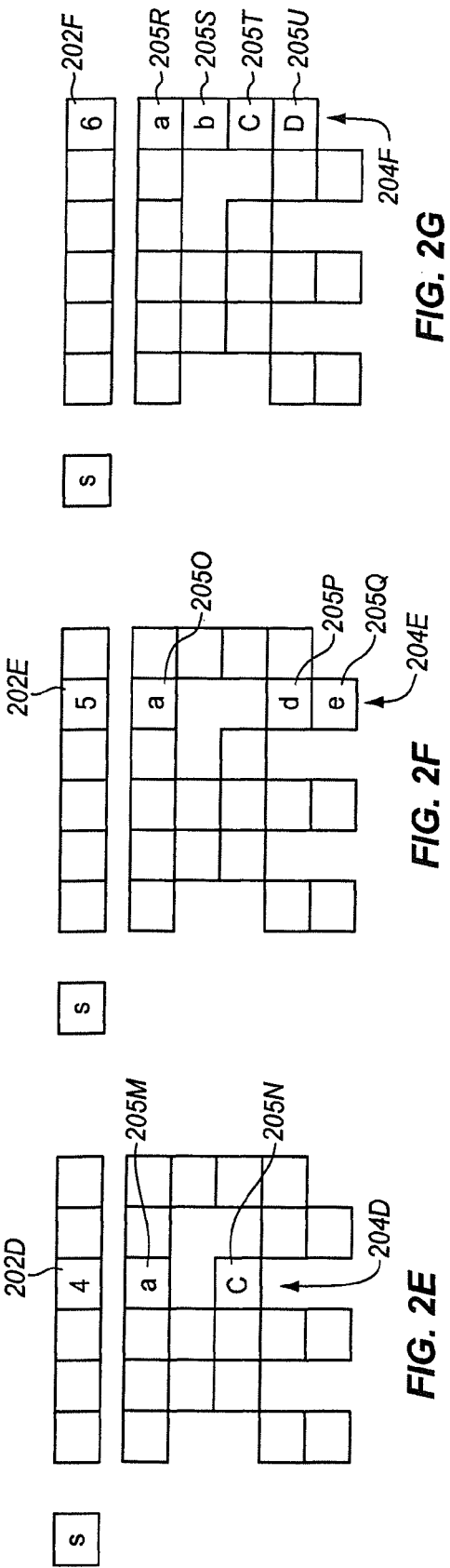

SYSTEM AND METHOD FOR THE DYNAMIC GENERATION OF CORRELATION SCORES BETWEEN ARBITRARY OBJECTS

RELATED APPLICATIONS

This application is a continuation of U.S. patent application Ser. No. 12/942,213, entitled "System and Method for the Dynamic Generation of Correlation Scores Between Arbitrary Objects", filed Nov. 9, 2010 now U.S. Pat. No. 8,200,677, which is a divisional of U.S. patent application Ser. No. 12/008,181, entitled "System and Method for the Dynamic Generation of Correlation Scores Between Arbitrary Objects", filed Jan. 8, 2008 (now U.S. Pat. No. 7,853,630, issued Dec. 14, 2010), which is a continuation-in-part of U.S. patent application Ser. No. 11/369,562, entitled, "Using Cross-Site Relationships to Generate Recommendations", filed Mar. 6, 2006 (now U.S. Pat. No. 7,788,358, issued Aug. 31, 2010), and based on U.S. Patent Application Ser. No. 60/932,718, entitled "System and Method for the Dynamic Generation of Correlation Scores Between Arbitrary Objects", filed Jun. 1, 2007; all of the aforementioned priority applications are hereby incorporated by reference in their respective entireties.

COPYRIGHT AUTHORIZATION

A portion of the disclosure of this patent document may contain material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates generally to creating lists of correlated items. More particularly, the invention relates to systems and methods for the dynamic generation of correlation scores between arbitrary objects to create a list of correlated items.

BACKGROUND

Collaborative filtering technology and cluster model technology have created processes that are used in the furtherance of business for generating sets of items that a consumer might find appealing. Many of these processes start by finding a set of customers that have purchased and rated items. The process chooses items that have interacted with similar customers, eliminates items according to business rules and presents a rank-ordered list of the remaining items to the end user.

Using collaborative filtering technology to generate items of interest or recommendations can become computationally very expensive when the data sets become large. In an effort to reduce the cost of computation, the data set is generally restricted by reducing the number of users considered, either arbitrarily or by heuristic mechanisms or by restricting the number of items. The wholesale reduction of the data set may negatively affect the quality of the items or content to be recommended. In addition, most correlation systems require the maintenance of a series of very large matrices—this can be computationally costly.

Therefore what has been needed and heretofore unavailable is a system and method for the dynamic generation of correlation scores between arbitrary objects to create a list of correlated items.

SUMMARY

According to one embodiment, a network is disclosed. The network includes a plurality of content servers, a client computer to access and establish relationships with one or more of the content servers and a management server to receive relationship information from the servers and to perform collaborative filtering on the relationship information to generate recommendations for the client.

In a further embodiment, a method is disclosed. The method includes generating a seed object, retrieving a list of objects corresponding to the seed object from a storage table, restricting the list of objects based upon a parameter list to generate a pivot set of objects, generating a candidate set by determining objects that have interacted with each of the pivot set of objects, computing a score for each member of the candidate set and generating a list of correlated items based upon at least one score.

BRIEF DESCRIPTION OF THE DRAWINGS

The inventive body of work will be readily understood by referring to the following detailed description in conjunction with the accompanying drawings, in which:

FIGS. 2A-2G illustrate one embodiment of a sequence of events for establishing a seed list to generate a list of correlated objects.

DETAILED DESCRIPTION

Figure 1:
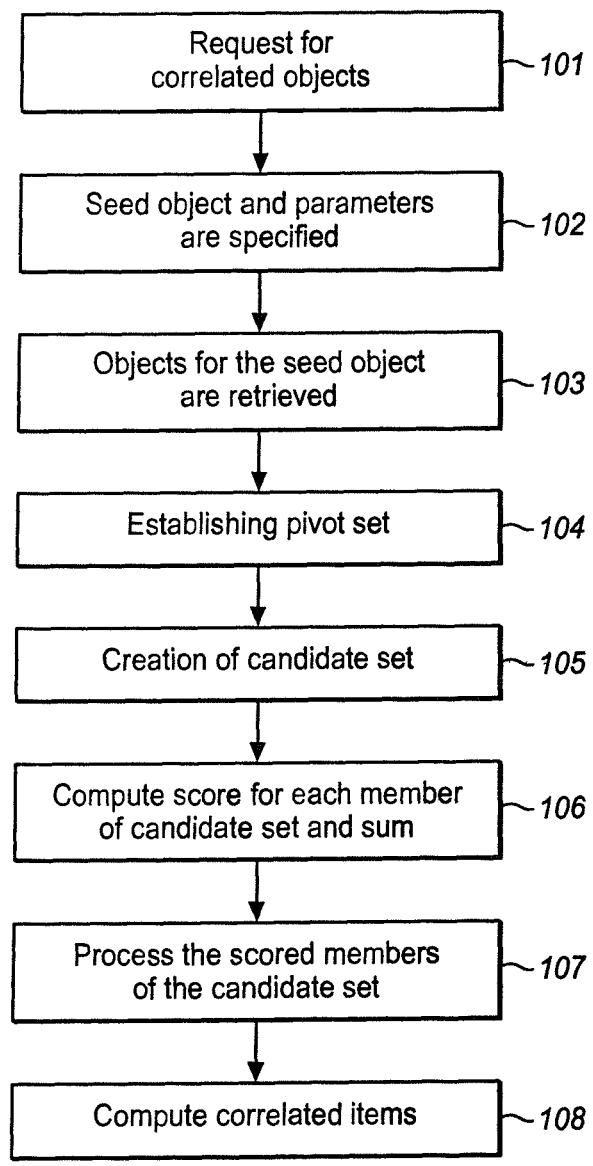
FIG. 1 is a flow chart illustrating one embodiment a technique for the dynamic generation of correlation scores between arbitrary objects for creating a list of correlated items.

A detailed description of the inventive body of work is provided below. While several embodiments are described, it should be understood that the inventive body of work is not limited to any one embodiment, but instead encompasses numerous alternatives, modifications, and equivalents. In addition, while numerous specific details are set forth in the following description in order to provide a thorough understanding of the inventive body of work, some embodiments can be practiced without some or all of these details. Moreover, for the purpose of clarity, certain technical material that is known in the related art has not been described in detail in order to avoid unnecessarily obscuring the inventive body of work.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Commonly-assigned U.S. patent application Ser. No. 11/369,562, entitled Using Cross-Site Relationships to Generate Recommendations filed Mar. 1, 2006 ("the '562 application"), which is hereby incorporated by reference in its entirety, describes embodiments of an invention related to determining recommendations by tracking interactions across multiple websites. The present application describes enhancements, extensions, and modifications to, as well as alternative embodiments of, the system described in the '562 application, as well as new components, architectures, and embodiments. It will thus be appreciated that the material described herein can be used in the context of determining recommendations by tracking interactions across multiple websites as described in the '562 application, as well as in other contexts.

According to one embodiment, an object and its associated list is described. An object is an entity, item, article or thing for which information can be gathered. Examples of objects include but are not limited to: a Web page, a person, a collection of lexical descriptors, a word, a shirt, a pair of shoes, an article or anything else capable of providing information. Objects are associated together using classification information. Examples of classification information include but are not limited to: behavioral data, textual analysis, or any other information that is suitable for associating objects together. Every object is uniquely represented in the system, along with an associated list of objects that are related to it by various mechanisms, such as behavior, lexical or semantic relationship or any other semantic representation of linkage.

The representation and lists may be stored as a hash table, a balanced binary tree, or any other mechanism having a suitable medium for storing like information as is well known to one of ordinary skill in the art. When a unit of classification information is collected, for example, a behavioral event is observed and the list corresponding to each affected object is updated. For example, if object A interacts with object B, the list of A is updated to include B, and the list of B is updated to include A. This process may occur through a variety of mechanisms, including offline behavior import, such as dumps of purchase behavior, as well as online implicit behavior gathering of select click stream data. In addition, other information may be encoded in the list, such as the type of the object, semantic meaning of the object relationship, the time of the event, or other classification information.

Embodiments of the invention may include various processes as set forth above. The processes may be embodied in machine-executable instructions. The instructions can be used to cause a general-purpose or special-purpose processor to perform certain steps. Alternatively, these processes may be performed by specific hardware components that contain hardwired logic for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

FIG. 1 is a flow chart illustrating one embodiment of the dynamic generation of correlation scores between arbitrary objects to create a list of correlated items. In processing block 101 a list of correlated objects is requested as a result of an external request for recommended content. In processing block 102, a seed object, such as a person or an item that is being viewed, and a set of parameters are specified, either statically as configuration information or dynamically with the input request, is created.

These parameters may include restrictions (for example, only to consider certain types of behavior) or other options that modify the runtime behavior of an algorithm. In processing block 103, a list of objects for the seed object is then retrieved via a lookup of stored relationship data in a storage table. The list is then restricted appropriately by whatever may have been specified in the set of parameters, thus establishing a pivot set, processing block 104. In processing block 105, each object that has interacted with all members of the pivot set are determined by applying appropriate restrictions creating a candidate set.

In processing block 106 as the candidate set is generated, a score for each member of the pivot set's contribution is computed, and these scores are summed. In one embodiment, these summed, values include a histogram that is input to the scoring algorithm. In processing block 107, the scored members of the candidate set are then processed by a scoring algorithm, such as the vector cosine or Pearson's R. At processing block 108, the scores are sorted to compute a list of correlated items. In one embodiment, each component of this process is computed on a single processor. In another embodiment, processing blocks 103, 104, 105, 106, 107 and 108 may each be computed in parallel on multiple processors or in a distributed fashion across multiple systems.

As discussed above, an entity is something about which information can be gathered. An entity can be uniquely identified through the assignation of a unique numerical value or through some other process. Entities can be broadly grouped together into types. For example, all people might be grouped together into a "people" type. This type information may be encoded into the uniquely identifying value described above.

Entities are logically linked by classification events. A classification event may be the result of behavioral observations, textual analysis, or some other means of associating one entity with another. For example, a classification event can be decomposed into a binary expression A*B, where the * operator implies action. For example, "user U loads Web page W" could be expressed as U*W, "label L applies to item I" could be expressed as L*I, or "user U played song S" as U*S. Information about entities is stored in a data store.

The data store may be represented through any of several different mechanisms: a hash table, a balanced tree such as a Red-Black Tree, or some other data structure. The data store provides the ability, given an entity, to look up all other entities that have been associated with the particular entity. This information may be stored as an ordered list or some other data structure. Other information may be stored as well.

For example, the time might be recorded, the intent that gave rise to the classification event (e.g., a person purchasing an item), or business level metadata about the transaction (sale status for a product, mature content flags for an article, etc.). An association method is used to generate a list of entities that are related to some other item. The process of association requires at least one initial entity, the seed, and a series of parameters. These parameters may include restrictions placed on the members of both the complete pivot set and partial candidate sets.

Figure 2A:
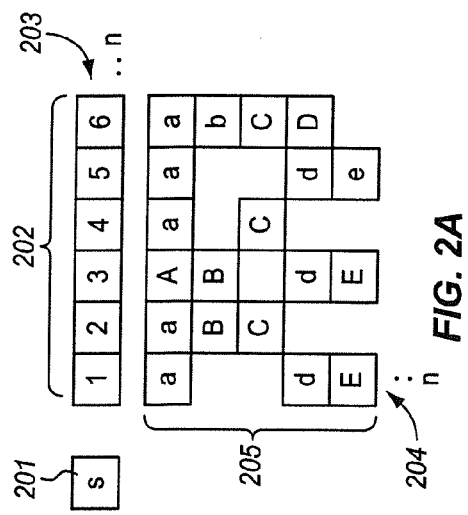

FIGS. 2A-2G depict diagrams in accordance with an embodiment of the present invention. In FIG. 2A the seed entity "S" 201 is depicted. Seed entity 201 is generated either by the user's interaction with the seed item, or as the user themselves. The list of entities 202 associated with the seed entity 201 is retrieved via a table lookup for all entities with which it is associated, producing the pivot set 203. Each entity 202 in the pivot set 203 is inspected in turn. If the entity 202 in the pivot set 203 does not meet the restriction criteria established (e.g., if purchase information is not being considered and the relationship represents a purchase), then it is excluded from further consideration, and we move on to the next entity 202 in the pivot set 203.

In the event that the entity 202 in the pivot set 203 is not excluded, then the list entities 205 associated with this particular entity 202 in the pivot set 203 is retrieved, producing a partial candidate set 204. Each list entity 205 in the partial candidate set 204 is inspected in turn. The list entity 205 may be excluded from further consideration by the established restriction criteria (e.g., if the relationship represents a view of an item, and only purchase data is being considered), we move on to the next list entity 205 in the partial candidate set 204.

Otherwise, the list entity 205 is assigned a raw score. Restriction criteria are based on a number of factors, such as the semantic relationship (intent) associated with the list entity's 205 inclusion in the partial candidate list 204 or some other criteria. A running sum of raw scores, each of which represents a weighted relationship between an item in the pivot set and the candidate set, for each list entity 205 is maintained, and is not depicted here. Based upon the summation of raw scores and the final scoring algorithm, entities will be generated for serving to a website or end user, not depicted here.

Figure 2D:
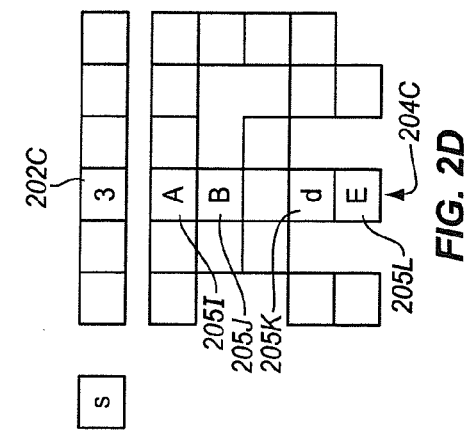
Figure 2C:
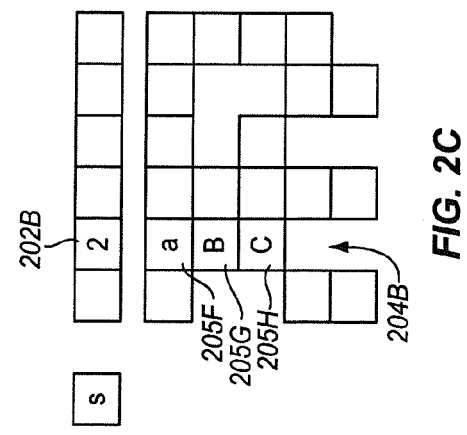
Figure 2B:
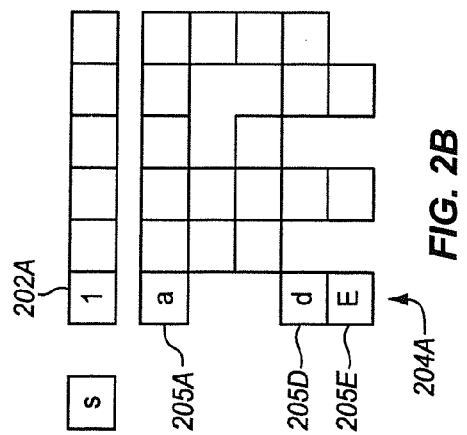

Referring now to FIG. 2B inspection of entity "1" 202A and its partial candidate set 204A is performed. In FIG. 2B, list entities "a" 205A and "d" 205D fail to meet the criteria for further consideration, and are thus represented in lower case letters. Entity "E" meets the criteria, and is therefore represented in upper case. In FIG. 2C inspection of entity "2" 202B and its partial candidate set 204B is performed, list entity "a" 205F fails to meet the criteria for further consideration. List entities "B" 205G and "C" 205H meet the criteria. In FIG. 2D inspection of list entity "3" 202C and its partial candidate set 204C is performed "a" "b" and "e" represented by 205I, 205J and 205L respectively, do not qualify list entity "D" 205K qualifies.

In FIG. 2E, inspection of entity "4" 202D is performed. List entity "a" 205M qualifies and list entity "c" 205N does not. In FIG. 2F no list entity 205 in the candidate set 204E for entity "5" 202E has met the criteria. Entity "5", 202E is excluded from the pivot set, and has been disregarded and its corresponding list entities are never examined during candidate set creation.

In FIG. 2G inspection of entity "6" and its partial candidate set 204F is performed. List entities "a" 205R and "b" 205S do not meet the criteria, list entities "C" 205T and "D" 205U meet the criteria. The raw scores for each entity, which are computed as a sum of the number of relationships between pivot items and candidate items which meet the criteria, can then be processed by a scoring algorithm, such as the vector cosine or Pearson's R. The results can then be sorted, either by the output score or some other pre-established criteria, to compute a list of associated entities suitable for input into a display mechanism. Although the foregoing embodiment shows a finite pivot set, a finite set of entities and a finite partial candidate set it should be understood that the invention is not so limited and are limited in order to simplify and clarify the present description.

Figure 3:
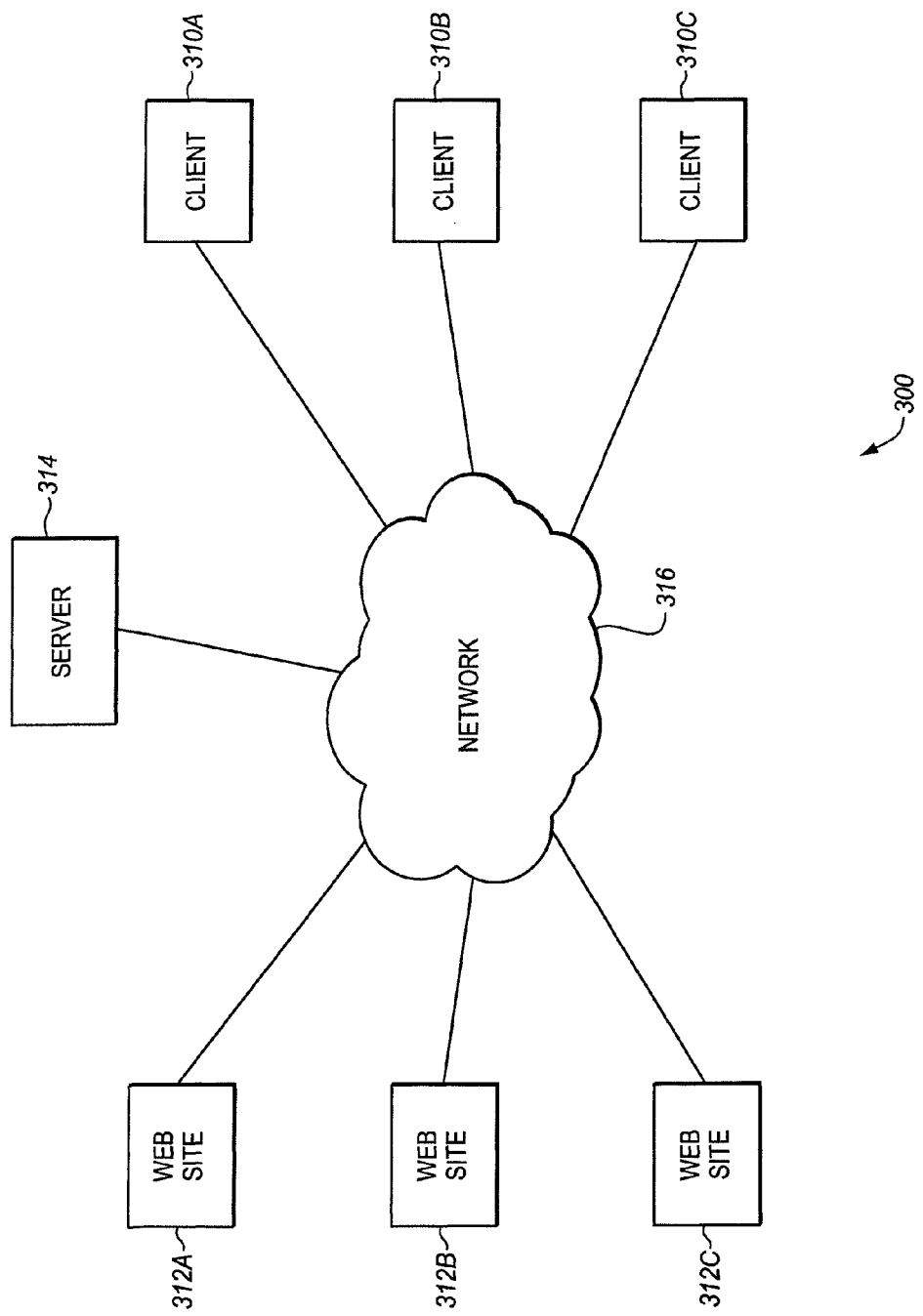
FIG. 3 is a high-level block diagram of one embodiment of a computing environment according to one embodiment of the present invention.

FIG. 3 is a high-level block diagram of a computing environment 300 according to one embodiment of the present invention. FIG. 3 illustrates three client computers 310A, 310B, 310C, three web sites 312A, 312B, 312C, and a server 314 connected by a network 316. At the highest level, end-users of the clients 310 interact with the web sites 312 to establish relationships. The web sites 312 and/or the clients 310 in one embodiment describe these relationships to the server 314 in other embodiments the server determines the relationships. The server 314 uses the techniques described above in connection with FIGS. 2A-2G and/or other techniques to process correlations in real time to compute lists of highly relevant items.

The client 310 in this embodiment represents a computer that is used by an end-user to interact with the web sites 312 and/or server 314 via the network 316. The client 310 can be, for example, a personal computer or another network-capable device, such as a personal digital assistant (PDA), a cellular telephone, a pager, a video game system, a television "set-top box" etc. Although FIG. 3 illustrates only three clients 310, embodiments of the present invention can have thousands or millions of clients participating in the environment 300 described herein. Three clients 310 are illustrated in order to simplify and clarify the present description.

The web sites 312 are locations on the network 316 that provide web pages to the clients 310 via the network 316. The web sites 312 can be, for example, media sites that primarily provide content such as news to the end-users, retailer sites that enable the end-users to purchase items, social networking sites that enable end-users to interact with other people, and hybrid sites that provide a mix of these features. Those of skill in the art will recognize that there may be an unlimited number of different types of web sites 312 with which the clients 310 can interact. Although FIG. 3 illustrates only three web sites 312, embodiments of the present invention can have many web sites. Only three websites 312 are illustrated in order to simplify and clarify the present description. The web sites 312 need not be related or associated with each other.

The end-users of the clients 310 interact with the web sites 312 to establish relationships. For example, assume an end-user views a web page for a digital camera, and then views a web page for a memory card for that camera. These actions create relationships between the end-user and the camera, and between the end-user and the memory card. The web sites 312 observe relationships such as these, and provide messages to the server 314 describing them.

In addition, the web sites 312 receive recommendations from the server 314. These recommendations are provided to the end-users, typically by including the recommendations on web pages served to the end-users' clients 310. The recommendations can be for arbitrary and/or heterogeneous items and the web sites can request that the server 314 provide recommendations for only specified types of items. For example, the recommendations can include items an end-user might want to purchase, news stories the end-user might want to read, bands the end-user might like, discussion groups in which the end-user might want to participate, etc.

The server 314 receives descriptions of relationships from the web sites 312 and/or clients 310 and provides recommendations in return. In one embodiment, the server 314 performs collaborative filtering on the received relationships to generate the recommendations. In other embodiments, the server 314 performs the method of FIG. 1 to generate at least one list of items to an end user 310. The relationships can be from multiple web sites 312 or a single website 312 and/or multiple clients 310 or a single client 310, they can form a large pool of data on which the recommendations are based. Moreover, in some embodiments the relationships created by end-users are tracked across multiple web sites 312, meaning that the recommendations are based on a larger set of relationships established by that end-user.

The network 316 represents the communication pathways between the clients 310, web sites 312, and server 314. In one embodiment, the network 316 is the Internet. The network 316 can also utilize dedicated or private communications links that are not necessarily part of the Internet. In one embodiment, the network 316 uses standard communications technologies and/or protocols. Thus, the network 316 can include links using technologies such as 802.11, integrated services digital network (ISDN), digital subscriber line (DSL), asynchronous transfer mode (ATM), etc.

Similarly, the networking protocols used on the network 316 can include multi-protocol label switching (MPLS), the transmission control protocol/Internet protocol (TCP/IP), the hypertext transport protocol (HTTP), the simple mail transfer protocol (SMTP), the file transfer protocol (FTP), etc. The data exchanged over the network 316 can be represented using technologies and/or formats including the hypertext markup language (HTML), the extensible markup language (XML), the web services description language (WSDL), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Figure 4:
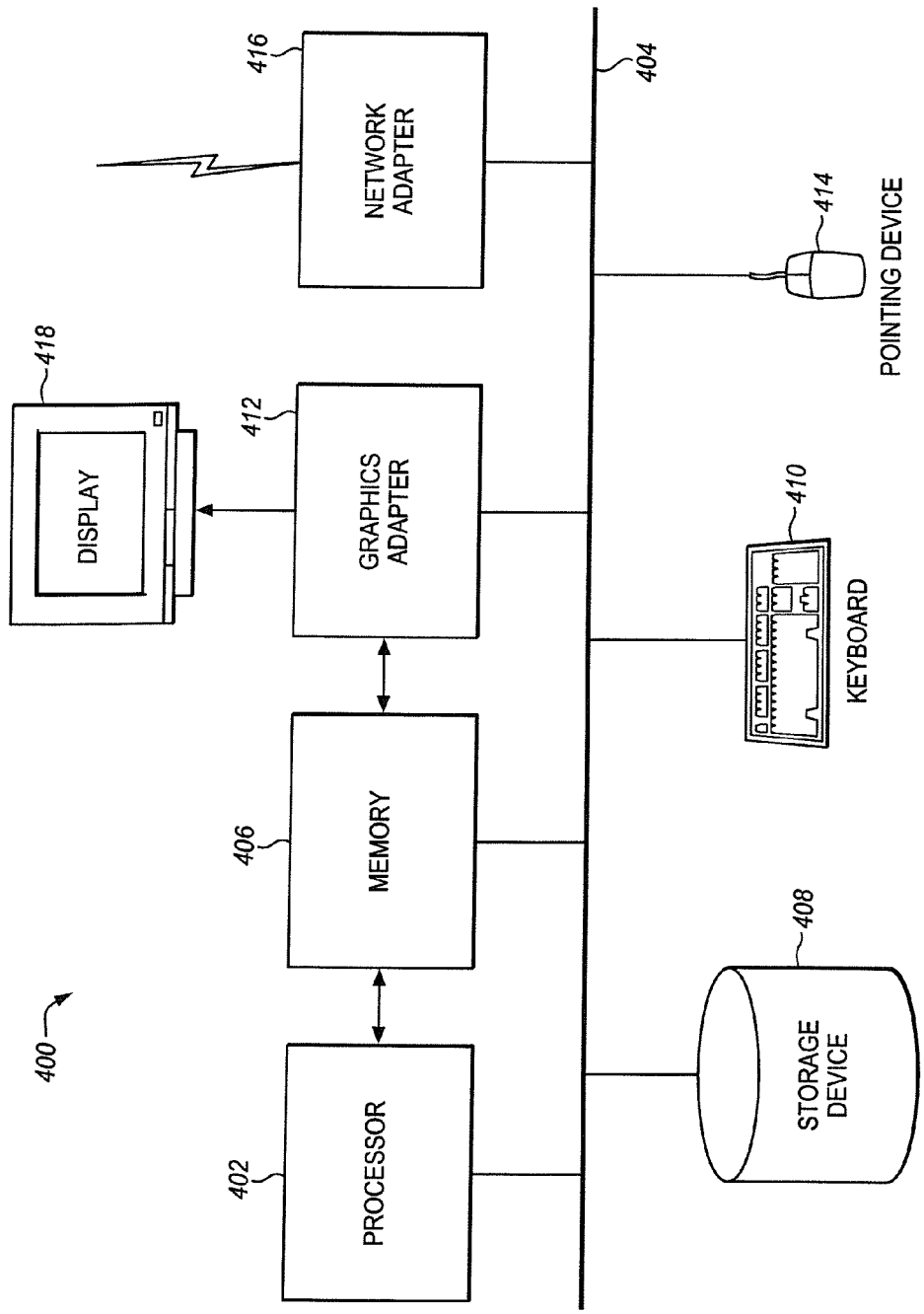
FIG. 4 is a high-level block diagram illustrating one embodiment of a functional view of a typical computer for use as one of the entities illustrated in an environment according to one embodiment of the present invention.

FIG. 4 is a high-level block diagram illustrating a functional view of a typical computer 400 for use as one of the entities illustrated in the environment 300 of FIG. 3 according to one embodiment. Illustrated are at least one processor 402 coupled to a bus 404. Also coupled to the bus 404 are a memory 406, a storage device 408, a keyboard 410, a graphics adapter 412, a pointing device 414, and a network adapter 416. A display 418 is coupled to the graphics adapter 412.

The processor 402 may be any general-purpose processor such as an INTEL x86, SUN MICROSYSTEMS SPARC, or POWERPC compatible-CPU. The storage device 1008 is, in one embodiment, a hard disk drive but can also be any other device capable of storing data, such as a writeable compact disk (CD) or DVD, or a solid-state memory device. The memory 406 may be, for example, firmware, read-only memory (ROM), non-volatile random access memory (NVRAM), and/or RAM, and holds instructions and data used by the processor 402. The pointing device 414 may be a mouse, track ball, or other type of pointing device, and is used in combination with the keyboard 410 to input data into the computer system 400. The graphics adapter 412 displays images and other information on the display 418. The network adapter 416 couples the computer system 400 to the network 408.

As is known in the art, the computer 400 is adapted to execute computer program modules. As used herein, the term "module" refers to computer program logic and/or data for providing the specified functionality. A module can be implemented in hardware, firmware, and/or software. In one embodiment, the modules are stored on the storage device 408, loaded into the memory 406, and executed by the processor 402.

The types of computers 400 utilized by the entities of FIG. 3 can vary depending upon the embodiment and the processing power required for the entity. For example, the client 310 typically requires less processing power than the web site 312 and server 314. Thus, the client 310 can be a personal computer, cellular telephone, etc. The web site 312 and server 314, in contrast, may comprise more powerful processors and/or multiple computers working together to provide the functionality described herein. In addition, the computers 400 can lack some of the features shown in FIG. 4. For example, a blade server supporting a web site 312 may lack a keyboard, pointing device, and display. In one embodiment, the computer 400 serving as the server 414 utilizes a processor 402 and/or memory 406 having a 64-bit word size.

Figure 5:
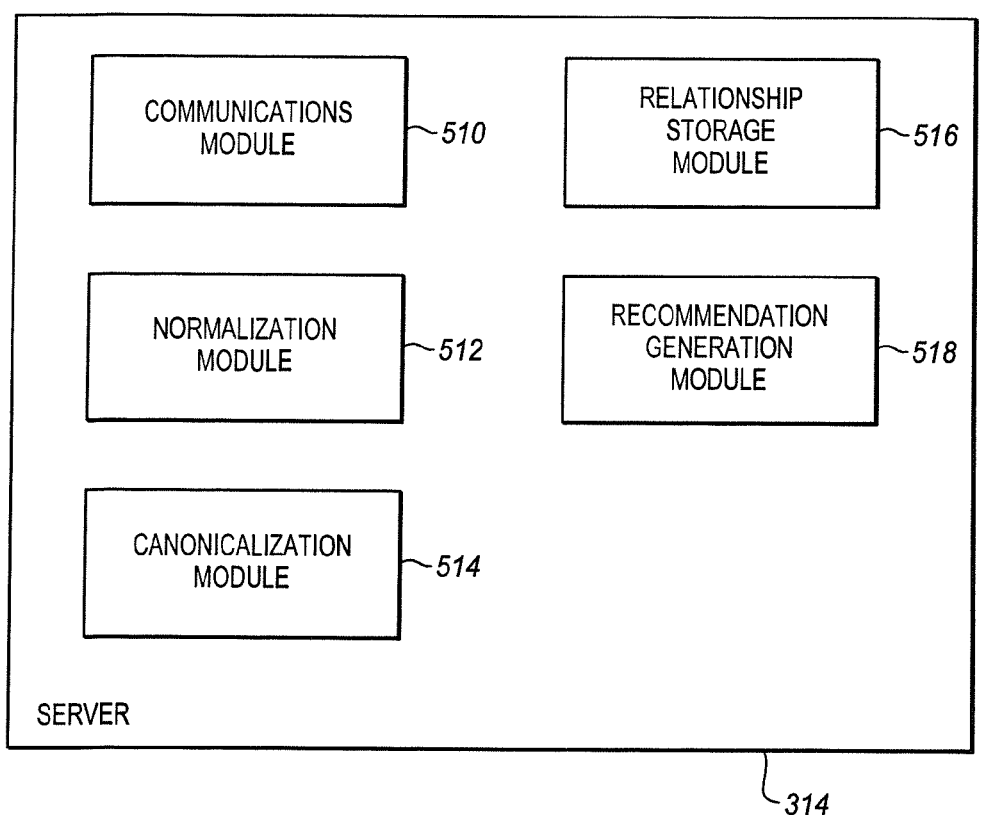
FIG. 5 is a high-level block diagram illustrating one embodiment of modules within a server according to one embodiment.

FIG. 5 is a high-level block diagram illustrating modules within the server 314 according to one embodiment. Those of skill in the art will recognize that other embodiments can have different and/or other modules than the ones described here, and that the functionalities can be distributed among the modules and/or entities illustrated in FIG. 3 in a different manner.

A communications module 510 communicates with the various web sites 312; clients 310, on the network 316. In one embodiment, the communications module 510 includes a web server that supports web services and allows the server 314 to receive messages describing relationships and/or requesting recommendations and provide messages containing recommendations in response.

A normalization module 512 normalizes the messages received from the web sites 312 and/or clients 310. In one embodiment, the normalization module 512 analyzes predicates within the messages and verifies that the labels associated within the predicates are in expected formats. If a label is not in the expected format, the normalization module 512 alters the label to place it in the correct format or rejects the message. The normalization module 512 modifies labels by adding or removing details such as protocol specifiers (e.g., "http://"), file name extensions (e.g., ".JPEG"), and the like. The normalization process thus ensures that like items are consistently identified even if different web sites 312, clients 310, and/or remote aggregation modules may use slightly different labels for them.

A canonicalization module 514 canonicalizes the normalized messages from the web sites 312 and/or clients 310. In one embodiment, the canonicalization module 514 associates labels, predicates, and intents with unique fixed-width integer values. In one embodiment, each unique label is associated with a unique 32-bit value. Each unique predicate is typically represented using fewer than 32 bits because most embodiments have only a limited number of predicates. Similarly, each unique intent is represented using only a few bits because there are only a limited number of possible intent types in one embodiment. In addition, the canonicalization module 514 maintains a table that associates the labels, predicates, and intents with their corresponding integers. Canonicalization thus allows each relationship to be stored in a fixed amount of memory.

In one embodiment, the canonicalization module 514 receives normalized messages from the normalization module 512 and extracts the labels, predicates and optional intents. The module 514 determines whether the labels, predicates, and intents have been encountered before and, if so, determines the integers that are associated with them. If a label, predicate or intent has not been encountered before, the canonicalization module 514 generates an arbitrary and unique integer value and associates the label, predicate, or intent with it. In one embodiment, the integer is generated by incrementing the previously-generated integer.

In addition, an embodiment of the canonicalization module 514 reverses the canonicalization process when providing recommendations or in other situations where it is necessary and/or desired. In one embodiment, the server 314 generates recommendations internally using the canonicalized representations of the relationships. The canonicalization module 514 maps the canonicalized representations back to their non-canonicalized meanings so that the recommendations can be sent out of the server 314.

A relationship storage module 516 stores the canonicalized relationships. Further, in one embodiment the storage module 516 stores the canonicalization table associating labels, predicates, and intents with their corresponding integer values. In one embodiment, the relationship storage module 516 stores this data in a relational database, such as a MySQL database.

The relationship storage module 516 also stores the data describing the relationships in a RAM or other relatively fast memory. In one embodiment, a canonicalized two-tuple, and an optional intent, are stored in a single 64-bit memory word. The relationship storage module 516 stores a relationship (i.e., a four-tuple and optional intent) as a linked set of 64-bit words. This is an efficient representation of the relationships and allows for fast manipulation of the relationship data by the computer acting as the server 314.

A recommendation generation module 518 generates recommendations for the web sites 312 and/or clients 310 based on the relationships stored by the relationship storage module 516. In one embodiment, the recommendation generation module 518 uses collaborative filtering and operates in real-time on the relationship data stored in the RAM or other fast memory. Real-time collaborative filtering allows for filtering based on arbitrary labels, predicates, intents, and/or relationships. Thus, given a (label, predicate) tuple, stored as a set of entity pairs in the relationship storage module 516, the recommendation generation module 518 generates a set of related (label, predicate) tuples that can be presented as recommendations. If necessary or desired, the related tuples can be limited to only certain types (e.g., tuples containing only certain predicates or intents). In one embodiment, the collaborative filtering itself is performed using conventional techniques.

In one embodiment the collaborative filtering is performed using relationships supplied by multiple web sites 312 and/or clients 310, and the resulting recommendations are of high quality. Moreover, since the activities of the end-users that provide personally identifiable information may be tracked across multiple web sites 312, the pool of relationships on which the collaborative filtering is based is deeper than if only single-site activities were tracked, however, results for single website are also contemplated by the invention.

Figure 6:
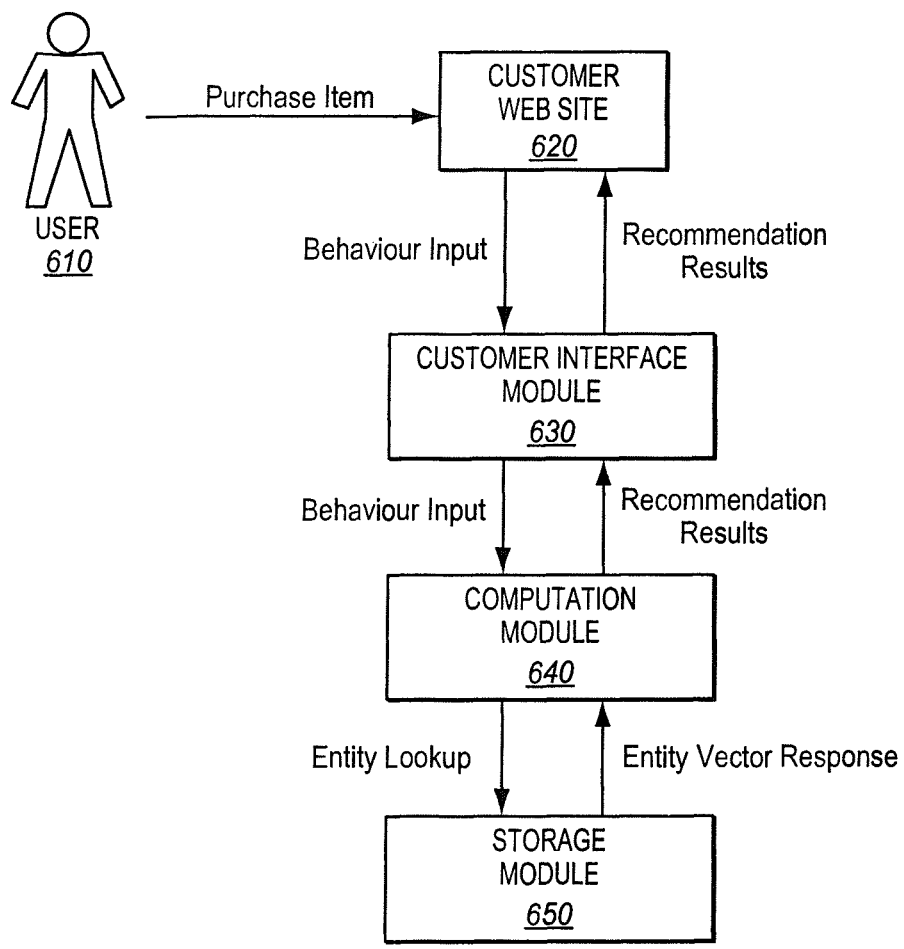
FIG. 6 is a high-level block diagram illustrating one embodiment of modules active in servicing a customer request according to one embodiment.

FIG. 6 is a high-level block diagram illustrating modules active in servicing a customer request according to one embodiment. Those of skill in the art will recognize that other embodiments can have different and/or other modules than the ones described here, and that the functionalities can be distributed among the modules and/or entities illustrated in FIG. 6 in a different manner.

A user 610 communicates with a customer web site 620, expressing an action taken on an entity. In this diagram, the user is purchasing an item, but those of skill in the art will recognize that an embodiment may encompass many types of interactions with arbitrary entities. As a result of the interaction with the entity, the customer web site 620 needs an output set of recommendations. In one embodiment, the customer website communicates directly with a customer interface module 630 directly. In another embodiment, the user 610 directly communicates with the customer interface module 630 as a result of the response from the web site 620.

In order to compute the output recommendations, the customer interface module 630 communicates the behavioral interaction data with the computation module 640. In one embodiment, the customer interface module 630 acts as a protocol translator, encompassing the functionality of the normalization module 512 and the canonicalization module 514 of FIG. 5 to translate the behavior data into an efficient representation for communication and storage. In one embodiment, the request to the computation module 640 includes behavior data along with a request for recommendation output in a single message.

In another embodiment, behavior data can be added to the storage module 650 in one message, and the request for recommendations can be communicated as a separate message to the computation module 640. In yet another embodiment, multiple requests for recommendations can be issued to the computation module 640 by the customer interface module 630 in response to a single request from the user 610 or customer web site 620, using elements of the user's view history to compute multiple sets of recommendations which are then returned as a group.

As a result of a request for recommendations with behavior input, the computation module 640 adds data points to the storage module 650 indicating the entity relationships that were added. In one embodiment, a single entity relationship is added to the storage module 650 as the result of a single request. In another embodiment, two explicit entity relationships are added to the storage module 650 as the result of a single request. In other embodiments, more explicit entity relationships are added depending on the circumstances.

In order to compute the recommendations, the computation module 640 then requests a vector dump from the storage module 650 for a seed item. In one embodiment, the seed item is selected by using the input item as the seed item. In another embodiment, the seed item is selected by using the person making the request as the seed item. The vector of all entities associated with the seed item is then filtered by the computation module 640 to create a set of entities that comprise the pivot set. In one embodiment, the filter conditions for creating the pivot set are supplied dynamically with the request for recommendations. In another embodiment, the filter conditions are supplied statically as configuration parameters to the computation module 640.

Once the pivot set is established, the computation module 640 queries the list of entities related to each entity in the pivot set by communicating with the storage module 650. The list of entities related to every member of the pivot set is then put in a table by the computation module 640, which comprises the candidate set of recommended items. In one embodiment, the candidate set comprises a histogram where each occurrence of an entity in the candidate set increments the histogram count for the entity. In another embodiment, the candidate set comprises a table of weighted scores, with each entity having a distinct weighted contribution to the score value based on its attributes, such as the time the relationship was established or other criteria.

Once the candidate set is established, the computation module 640 applies a scoring algorithm, such as the vector cosine or Pearson's R, which establishes the output score for the entity. Once the output score set is established, the entities are sorted by the output score and returned to the customer interface module 630. In one embodiment, if the output results from the scored set are people, then a secondary algorithm is used to select items to which the people are related for return to the customer interface module 630. In one embodiment, a selection algorithm for items when the candidate set contains references to people would be choosing recently viewed items. In other embodiments, different item selection mechanisms can be employed.

The customer interface module 630 then prepares the results in an external form for return to the customer web site 620. In one embodiment, the customer interface module 630 translates an efficient stored format of the results to an external representation, such as URLs. In another embodiment, the customer interface module 630 translates the stored format of the results obtained from the computation engine 640 into a set of textual descriptions or image URLs.

After the customer interface module 630 translates the results to an external format, they are transmitted to the customer web site 620 for inclusion in the output content returned to the user 610. In one embodiment, the results are returned to the customer web site 620 and processed to include it in the result returned to the user 610. In another embodiment, the results are returned directly to the user 610 by the customer interface module 640.

Figure 7:
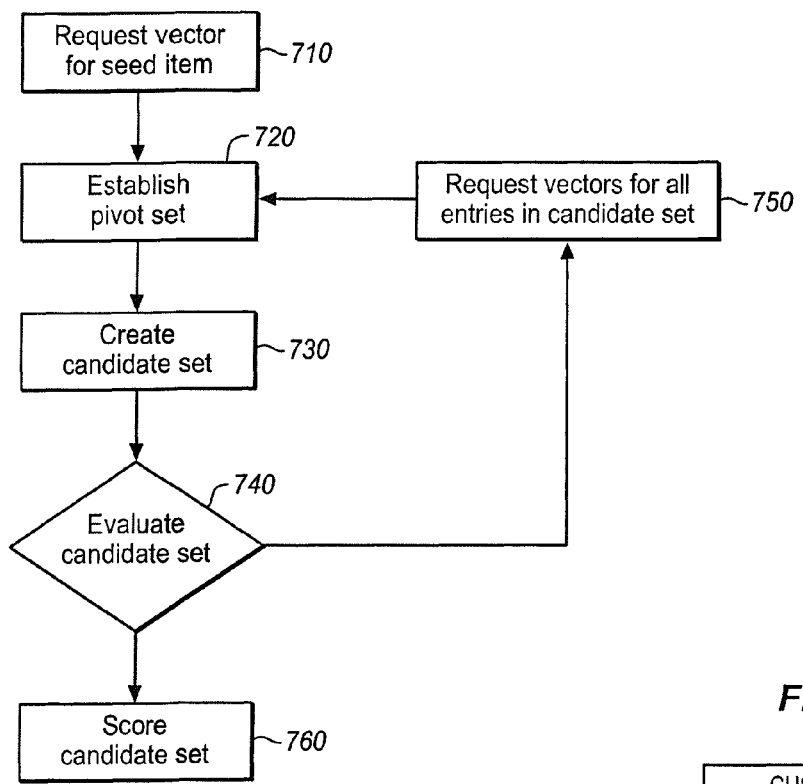
FIG. 7 is a high-level block diagram illustrating one embodiment a functional view of a technique for increasing recommendation quality according to one embodiment.

FIG. 7 is a high-level block diagram illustrating a functional view of a method for recommendation quality according to one embodiment. Those of skill in the art will recognize that other embodiments may have different and/or other modules than the ones described here, and that the functionalities can be distributed among the modules and/or entities illustrated in FIG. 7 in a different manner.

A seed item is selected externally by the computation module 640 (not shown) and the vector of all related entities is fetched for the seed item in processing block 710. Restrictions are applied to the entities in the seed item vector to establish the pivot set in processing block 720. The candidate set is created in processing block 730 by fetching the list of all related entities for the members of the pivot set and filtering appropriately.

After the initial candidate set is created in processing block 730, it is evaluated in processing block 740 to determine if the score values are acceptable. In one embodiment, score values are a proxy to strength of behavioral linkage. After the score values are evaluated in processing block 740, if they are not determined to be sufficient, execution moves to processing block 750, in which the entire set of entities in the candidate set are transformed into seed items. Processing block 750 is a logical analog of processing block 710, with the difference being that processing block 750 uses the entire candidate set to create a set of seed items. With the vectors established for all seed items, execution proceeds to processing block 720 to filter the pivot set exactly as in the single seed item execution case.

When execution reaches evaluation of the candidate processing block 740, if the candidate scores are found to be acceptable, execution proceeds to the final scoring processing block 760, using any scoring algorithm familiar to persons skilled in the art, such as vector cosine or Pearson's R.

Figure 8:
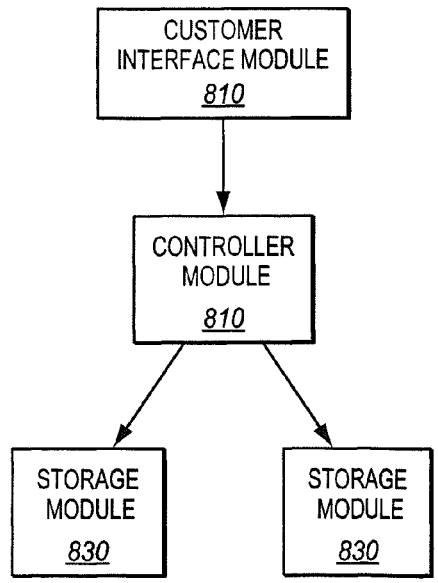
FIG. 8 is a high-level block diagram illustrating one embodiment of modules within a multi-server operation according to one embodiment.

FIG. 8 is a high-level block diagram illustrating modules within a multi-server operation according to one embodiment. Those of skill in the art will recognize that other embodiments can have different and/or other modules than the ones described here, and that the functionalities can be distributed among the modules and/or entities illustrated in FIG. 8 in a different manner.

The embodiment depicted in FIG. 8 illustrates a technique for distributing the data set stored in the relationship storage module 516 of FIG. 5 across multiple servers. In one embodiment, the storage mechanism used by the relationship storage module 516 uses DRAM for high speed access. In order to maintain performance, this embodiment distributes functionality of the computation module 640 and the storage module 650 across more than one server.

The controller module 820 acts as a central mechanism of control for the algorithm; responsible for controlling which data is stored on the storage module 830. In one embodiment, the data distribution mechanism is done using a hash of the entity numeric key value. The controller module 820 first establishes a pivot set (step 102, 103 and 104) by selecting a node using the data distribution mechanism to locate the correct storage module 830 and then requesting the full contents of the vector from the storage module 830. In one embodiment, the storage module 830 contains the full entity list of related entities in a single storage module 830. In another embodiment, an entity list for a single entity may exist on more than one storage module 830.

After the pivot set is established (step 104) in FIG. 1, the controller module uses the data distribution mechanism to group entities by the node(s) on which data for the entities is stored. In one embodiment, the controller module 820 requests data for multiple entities from a single storage module 830 in a single request. In another embodiment, each request for data about an entity from the controller module 820 to the storage module 830 is performed in multiple requests. When the controller module 820 has collected data from the storage module 830 for all entities, it creates the candidate set as described above in connection with FIG. 1. In one embodiment, the functionality of creating the scores for members of the candidate set is distributed between the controller module 820 and the storage module 830.

Once the candidate set has been established, the controller module 820 processes the members of the candidate set to apply the final scoring algorithm.

Although the foregoing has been described in some detail for purposes of clarity, it will be apparent that certain changes and modifications may be made within the scope of the appended claims. It should be noted that there are many alternative ways of implementing both the processes and apparatuses described herein. Accordingly, the present embodiments are to be considered as illustrative and not restrictive, and the inventive body of work is not to be limited to the details given herein, but may be modified within the scope and equivalents of the appended claims.

What is claimed is:

1. A network comprising:
a plurality of content servers;
a client computer to access and establish relationships with one or more of the content servers; and
a management server to receive relationship information from the servers and to perform collaborative filtering on the relationship information to generate recommendations for the client, the collaborative filtering including:
generating a seed object;
retrieving a list of objects corresponding to the seed object from a storage table;
restricting the list of objects based upon a parameter list to generate a pivot set of objects;
generating a candidate set by determining objects that have interacted with each of the pivot set of objects;

computing a score for each member of the candidate set; and generating a list of correlated items based upon at least one score.

2. The network of claim 1, wherein the management server further comprises:
   a communications module configured to communicate with one or more of the content servers and the client computer; and
   a normalization module configured to normalize messages from one or more of the content servers and the client computer.

3. The network of claim 2, wherein the normalization module analyzes predicates within the received messages and verifies that the labels associated within the predicates are in expected formats.

4. The network of claim 3, wherein the normalization module modifies the labels by adding or removing details if the labels are not in an expected format.

5. The network of claim 4, wherein the management server further comprises:
   a canonicalization module to canonicalize the normalized messages by associating labels, predicates, and intents with unique fixed-width integer values; and
   a storage module to store a table of canonicalized relationships.

6. The network of claim 5, wherein the canonicalization module receives and extracts the labels, predicates and optional intents from the normalized messages and looks up a corresponding integer value in the table.

7. The network of claim 6, wherein the management server further comprises a recommendation generation module to generate recommendations for the client computer based on the relationships stored in the storage module.

8. The article of manufacture of claim 1, wherein the score is calculated using a Pearson's R algorithm.

9. A management server comprising:
   a storage module to store a table of relationship information between one or more content servers and a client computer; and
   a recommendation generation module to perform collaborative filtering on the stored relationship information and to generate recommendations for a client computer, the collaborative filtering including:
   generating a seed object;
   retrieving a list of objects corresponding to the seed object from a storage table;
   restricting the list of objects based upon a parameter list to generate a pivot set of objects;
   generating a candidate set by determining objects that have interacted with each of the pivot set of objects;
   computing a score for each member of the candidate set; and
   generating a list of correlated items based upon at least one score.

10. The management server of claim 9, wherein the management server further comprises:
    a communications module configured to communicate with one or more of the content servers and the client computer; and
    a normalization module configured to normalize messages from one or more of the content servers and the client computer.

11. The management server of claim 10, wherein the normalization module analyzes predicates within the received messages and verifies that the labels associated within the predicates are in expected formats.

12. The management server of claim 11, wherein the normalization module modifies the labels by adding or removing details if the labels are not in an expected format.

13. The management server of claim 12, wherein the management server further comprises:
    a canonicalization module to canicalize the normalized messages by associating labels, predicates, and intents with unique fixed-width integer values.

14. The management server of claim 13, wherein the canonicalization module receives and extracts the labels, predicates and optional intents from the normalized messages and looks up an corresponding integer value in the table.

* * * * *